United States Patent
Sundar Pal et al.

(10) Patent No.: US 10,449,959 B2
(45) Date of Patent: Oct. 22, 2019

(54) SYSTEM AND METHOD FOR NAVIGATING AN AUTONOMOUS VEHICLE

(71) Applicant: WIPRO LIMITED, Bangalore (IN)

(72) Inventors: Shyam Sundar Pal, Kolkata (IN); Balaji Sunil Kumar, Bengaluru (IN); Manas Sarkar, Kolkata (IN)

(73) Assignee: Wipro Limited, Bangalore (IN)

( * ) Notice: Subject to any disclaimer, the term of this patent is extended or adjusted under 35 U.S.C. 154(b) by 16 days.

(21) Appl. No.: 15/838,727

(22) Filed: Dec. 12, 2017

(65) Prior Publication Data

US 2019/0126919 A1    May 2, 2019

(30) Foreign Application Priority Data

Oct. 30, 2017  (IN) .............................. 201741038353

(51) Int. Cl.
*B60W 30/095* (2012.01)
*G05D 1/02* (2006.01)
(Continued)

(52) U.S. Cl.
CPC .... *B60W 30/0953* (2013.01); *B60W 30/0956* (2013.01); *B60W 30/18163* (2013.01);
(Continued)

(58) Field of Classification Search
CPC ....... B60W 30/0953; B60W 30/18163; B60W 2550/30; B60W 30/0956; G08G 1/167;
(Continued)

(56) References Cited

U.S. PATENT DOCUMENTS

| | | | | |
|---|---|---|---|---|
| 5,887,268 A | * | 3/1999 | Furukawa ............ | G05D 1/0257 |
| | | | | 318/687 |
| 10,017,180 B2 | * | 7/2018 | Ishioka ............... | B60W 30/143 |

(Continued)

OTHER PUBLICATIONS

Bautista, D. G., "Functional architecture for automated vehicles trajectory planning in complex environments", URL: https://pastel.archives-ouvertes.fr/tel-01568505/file/2017PSLEM002_archivage.pdf, (2017), 161 pages.

(Continued)

*Primary Examiner* — Tyler J Lee
(74) *Attorney, Agent, or Firm* — Finnegan, Henderson, Farabow, Garrett & Dunner, LLP

(57) ABSTRACT

A method and system for navigating an autonomous vehicle is disclosed. The method comprises determining a relative velocity between the autonomous vehicle and each of one or more surrounding vehicles. Thereafter, the relative velocity associated with each of the one or more surrounding vehicles may be compared with a predefined relative speed threshold to identify a plurality of vehicles-of-interest from the one or more surrounding vehicles. An area bounded by the plurality of vehicles-of-interest may then be determined as a current navigable space for the autonomous vehicle. Subsequently, a future navigable space for the autonomous vehicle may be predicted based on a predicted velocity of the plurality of vehicles-of-interest and a predicted distance to the plurality of vehicles-of-interest. The autonomous vehicle may then be navigated based on the current navigable space and the future navigable space.

15 Claims, 4 Drawing Sheets

(51) Int. Cl.
*G08G 1/16* (2006.01)
*B62D 15/02* (2006.01)
*G05D 1/00* (2006.01)
*B60W 30/18* (2012.01)
*B60W 50/00* (2006.01)

(52) U.S. Cl.
CPC ......... *G05D 1/0088* (2013.01); *G05D 1/0223* (2013.01); *G08G 1/167* (2013.01); *B60W 50/0097* (2013.01); *B60W 2550/30* (2013.01); *B62D 15/0255* (2013.01); *G05D 2201/0213* (2013.01)

(58) Field of Classification Search
CPC ............... G05D 1/0088; G05D 1/0223; G05D 2201/0213
See application file for complete search history.

(56) References Cited

U.S. PATENT DOCUMENTS

| | | | | |
|---|---|---|---|---|
| 10,146,223 B1* | 12/2018 | Luders | ................. | G01S 17/936 |
| 10,147,320 B1* | 12/2018 | Ellis | ..................... | B60W 30/14 |
| 2003/0218564 A1* | 11/2003 | Tamatsu | ................. | G01S 7/414 |
| | | | | 342/70 |
| 2003/0234127 A1* | 12/2003 | Sudou | ............... | B60K 31/0008 |
| | | | | 180/170 |
| 2005/0182539 A1* | 8/2005 | Maass | .................. | B60Q 9/008 |
| | | | | 701/41 |
| 2009/0088941 A1* | 4/2009 | Tsuchiya | ........... | B60K 31/0075 |
| | | | | 701/93 |
| 2010/0082212 A1* | 4/2010 | Miyajima | .......... | B60K 31/0066 |
| | | | | 701/70 |
| 2010/0228419 A1 | 9/2010 | Lee et al. | | |
| 2010/0256852 A1* | 10/2010 | Mudalige | ............... | G08G 1/163 |
| | | | | 701/24 |
| 2011/0276246 A1* | 11/2011 | Kuze | .................... | B60W 10/06 |
| | | | | 701/96 |
| 2014/0195093 A1* | 7/2014 | Litkouhi | ........... | B62D 15/0255 |
| | | | | 701/23 |
| 2016/0185388 A1* | 6/2016 | Sim | .................... | B62D 15/0255 |
| | | | | 701/41 |
| 2016/0272172 A1* | 9/2016 | Lee | ........................... | B60T 7/22 |
| 2017/0015354 A1 | 1/2017 | Nilsson et al. | | |
| 2017/0039855 A1* | 2/2017 | Maeda | ............... | B60K 31/0008 |
| 2017/0120912 A1* | 5/2017 | Ishioka | ............... | B60W 30/143 |
| 2017/0233004 A1 | 8/2017 | Hatano | | |
| 2018/0148060 A1* | 5/2018 | Hashimoto | ........ | B62D 15/0255 |
| 2018/0157038 A1* | 6/2018 | Kabe | ................... | G02B 27/0101 |
| 2018/0345957 A1* | 12/2018 | Ohmura | ............... | B60W 30/09 |

OTHER PUBLICATIONS

Milanes, D.F., et al., "Intelligent automatic overtaking system using vision for vehicle detection", Expert Systems with Applications, vol. 39, No. 3, (2012), pp. 3362-3373.

Wan, L., et al., "Lane Change Behavior Modeling for Autonomous Vehicles Based on Surroundings Recognition", International Journal of Automotive Engineering, (2010), pp. 7-12.

Extended European Search Report issued in the European Patent Office in counterpart European Application No. 17209583.8, dated Jul. 9, 2018, 12 pages.

* cited by examiner

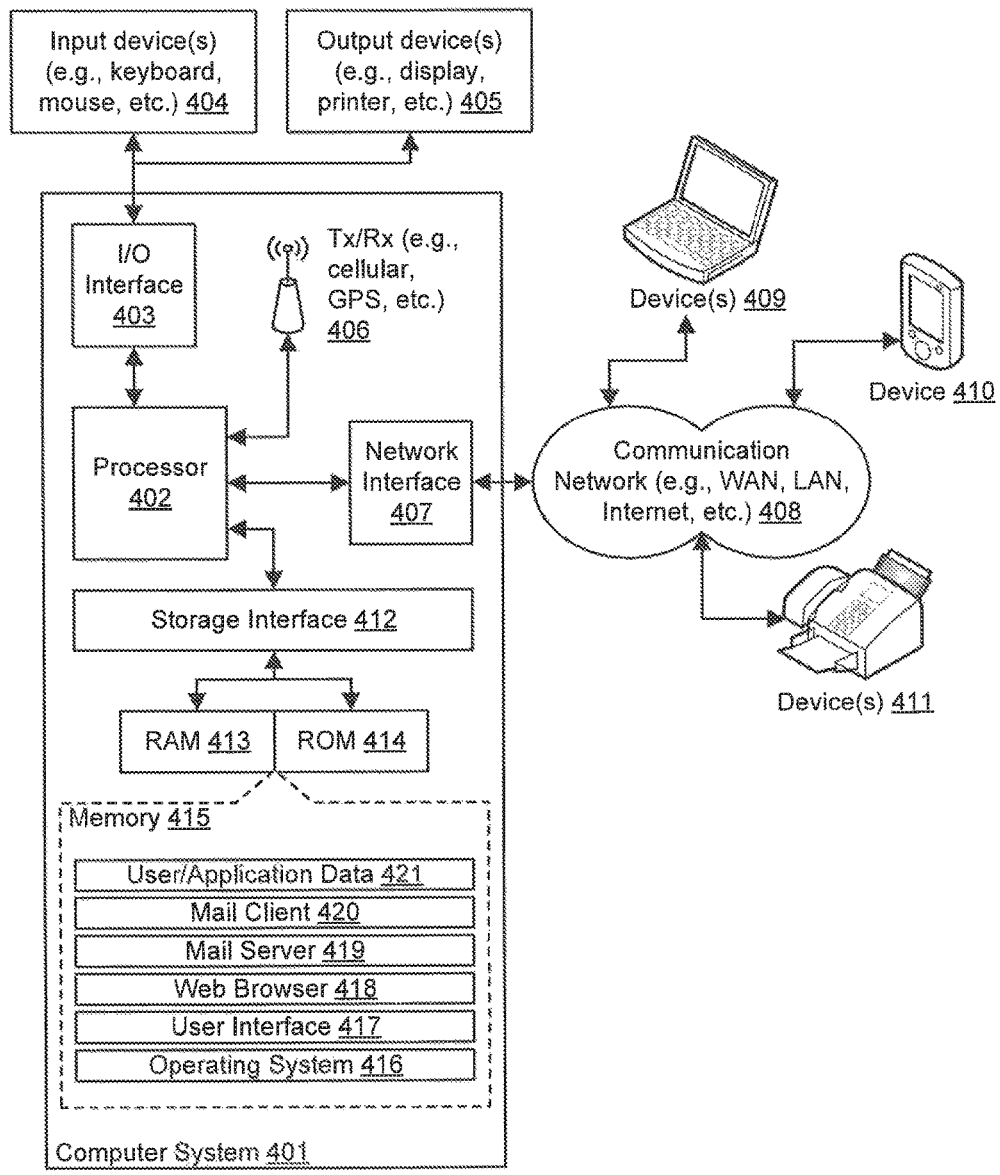
FIG. 4: Example Computer System

SYSTEM AND METHOD FOR NAVIGATING AN AUTONOMOUS VEHICLE

PRIORITY CLAIM

This U.S. patent application claims priority under 35 U.S.C. § 119 to Indian Application No. 2017410385353 filed Oct. 30, 2017. The aforementioned applications are incorporated herein by reference in their entirety.

TECHNICAL FIELD

This disclosure relates generally to intelligent vehicle technology and more particularly to a system and method for navigating an autonomous vehicle or a semi-autonomous vehicle.

BACKGROUND

Autonomous vehicles are vehicles that are capable of navigating roads by sensing environment around the autonomous vehicles. The autonomous vehicles do not require human inputs. In contrast, semi-autonomous vehicles are vehicles that may occasionally require human inputs. Presently cruise control systems, adaptive cruise control systems, autonomous parking are available in the market. Although fully autonomous vehicles have been test driven, they have not yet been deployed in the market.

Smooth lane changing and overtaking manoeuvre are essential for safety and comfort of both driver and passengers. Human error is common in these critical actions. Perhaps this might be due to inaccurate or untimely interpretation of surrounding vehicle's information. Hence, there arises a need for autonomous or semi-autonomous vehicles that incorporate intelligent algorithms that easily executes these critical actions.

Presently attempts at incorporating intelligent algorithms to perform lane change and overtaking manoeuvre includes estimating current position and a moving direction of the autonomous vehicles using sensors and generating a path for changing the lane from the current position and the moving direction. But this attempt is dependent on the accuracy of the sensors. Hence, there is a need for a system which can provide feasibility of lane change based on clear view around the autonomous vehicle.

SUMMARY

In an embodiment, the present disclosure illustrates a method of navigating an autonomous vehicle. The method comprises determining a relative velocity between the autonomous vehicle and each of one or more surrounding vehicles. Thereafter, the relative velocity associated with each of the one or more surrounding vehicles may be compared with a predefined relative speed threshold to identify a plurality of vehicles-of-interest from the one or more surrounding vehicles. An area bounded by the plurality of vehicles-of-interest may then be determined as a current navigable space for the autonomous vehicle. Subsequently, a future navigable space for the autonomous vehicle may be predicted based on a predicted velocity of the plurality of vehicles-of-interest and a predicted distance to the plurality of vehicles-of-interest. The autonomous vehicle may then be navigated based on the current navigable space and the future navigable space.

In another embodiment, a navigating device for navigating an autonomous vehicle is disclosed. The navigating device comprises a processor and a memory communicatively coupled to the processor. The memory stores processor instructions, which, on execution, causes the processor to determine a relative velocity between the autonomous vehicle and each of one or more surrounding vehicles. The memory further includes instructions to compare the relative velocity associated with each of the one or more surrounding vehicles with a predefined relative speed threshold to identify a plurality of vehicles-of-interest from the one or more surrounding vehicles. An area bounded by the plurality of vehicles-of-interest may then be determined as a current navigable space for the autonomous vehicle. The memory may also store instructions to predict a future navigable space for the autonomous vehicle based on a predicted velocity of the plurality of vehicles-of-interest and a predicted distance to the plurality of vehicles-of-interest. The autonomous vehicle may then be navigated based on the current navigable space and the future navigable space.

In yet another embodiment, a non-transitory computer readable storage medium is provided. The storage medium stores a program that, when executed by a computer, cause the computer to perform a method of navigating an autonomous vehicle. The method comprises determining a relative velocity between the autonomous vehicle and each of one or more surrounding vehicles. Thereafter, the relative velocity associated with each of the one or more surrounding vehicles may be compared with a predefined relative speed threshold to identify a plurality of vehicles-of-interest from the one or more surrounding vehicles. An area bounded by the plurality of vehicles-of-interest may then be determined as a current navigable space for the autonomous vehicle. Subsequently, a future navigable space for the autonomous vehicle may be predicted based on a predicted velocity of the plurality of vehicles-of-interest and a predicted distance to the plurality of vehicles-of-interest. The autonomous vehicle may then be navigated based on the current navigable space and the future navigable space.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 4 is a block diagram of an exemplary computer system for implementing embodiments consistent with the present disclosure.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The present subject matter discloses a system and method for navigating an autonomous vehicle. The system and method may be implemented in a variety of computing systems.

Working of the systems and methods for navigating an autonomous vehicle is described in conjunction with FIG. 14. It should be noted that the description and drawings merely illustrate the principles of the present subject matter. It will thus be appreciated that those skilled in the art will be able to devise various arrangements that, although not explicitly described or shown herein, embody the principles of the present subject matter and are included within its spirit and scope. Furthermore, all examples recited herein are principally intended expressly to be only for pedagogical purposes to aid the reader in understanding the principles of the present subject matter and are to be construed as being without limitation to such specifically recited examples and conditions. Moreover, all statements herein reciting principles, aspects, and embodiments of the present subject matter, as well as specific examples thereof, are intended to encompass equivalents thereof. While aspects of the systems and methods can be implemented in any number of different computing systems environments, and/or configurations, the embodiments are described in the context of the following exemplary system architecture(s).

Figure 1:
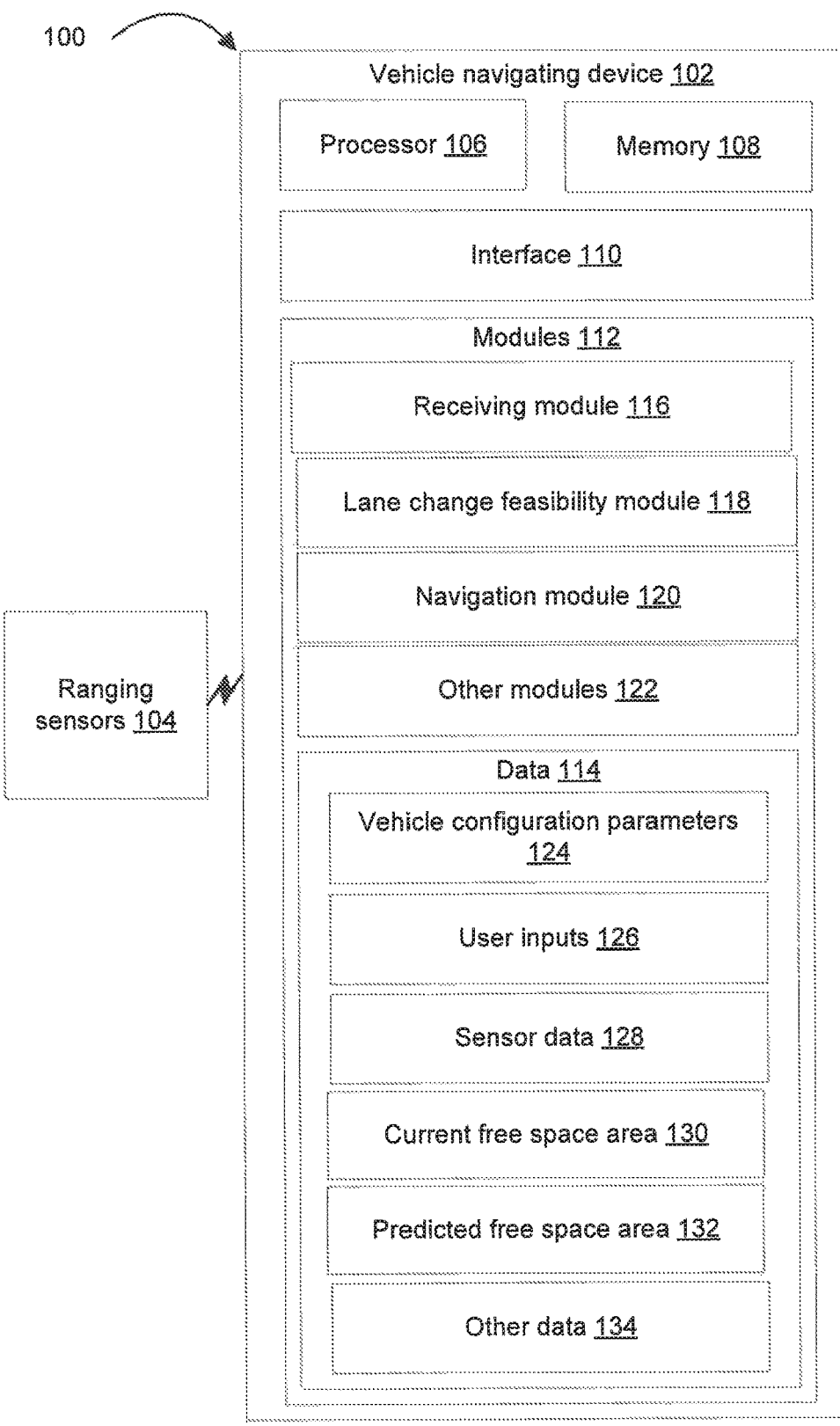
FIG. 1 illustrates an exemplary network implementation comprising a vehicle navigating device for navigating an autonomous vehicle, according to some embodiments of the present disclosure.

FIG. 1 illustrates an exemplary network environment 100 comprising a navigating device 102, in accordance with some embodiments of the present disclosure. As shown in FIG. 1, the navigating device 102 may be communicatively coupled to one or more ranging sensors such as ranging sensors 104. Ranging sensors 104 may include, but are not limited to, a Light Detection and Ranging (LIDAR) sensor, a radar sensor, and/or an ultrasonic sensor.

The navigating device 102 may be communicatively coupled to the ranging sensors 104 through a network. The network may be a wireless network, wired network or a combination thereof. The network can be implemented as one of the different types of networks, such as intranet, local area network (LAN), wide area network (WAN), the internet, and such. The network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the network may include a variety of network devices, including routers, bridges, servers, computing devices, storage devices, etc.

As shown in FIG. 1, the navigating device 102 comprises a processor 106, a memory 108 coupled to the processor 106, and interface(s) 110. The processor 106 may be implemented as one or more microprocessors, microcomputers, microcontrollers, digital signal processors, central processing units, state machines, logic circuitries, and/or any devices that manipulate signals based on operational instructions. Among other capabilities, the processor 106 is configured to fetch and execute computer-readable instructions stored in the memory 108. The memory 108 can include any non-transitory computer-readable medium known in the art including, for example, volatile memory (e.g., RAM), and/or non-volatile memory (e.g., EPROM, flash memory, etc.).

The interface(s) 110 may include a variety of software and hardware interfaces, for example, a web interface, a graphical user interface, etc., allowing the navigating device 102 to interact with a user or other computing devices. The interface(s) 110 may facilitate multiple communications within a wide variety of networks and protocol types, including wired networks, for example LAN, cable, etc., and wireless networks such as WLAN, cellular, or satellite. The interface(s) 110 may include one or more ports for connecting a number of devices to each other or to a server.

In one example, the navigating device 102 may include modules 112 and data 114. In one embodiment, the modules 112 and the data 114 may be stored within the memory 108. In one example, the modules 112, amongst other things, include routines, programs, objects, components, and data structures, which perform particular tasks or implement particular abstract datatypes.

In one implementation, the modules 112 may include a receiving module 116, a lane change feasibility module 118 and a navigation module 120. The receiving module 118 may receive user inputs, configuration parameters and sensor data from ranging sensors 104. The lane change feasibility module 118 may determine the feasibility of a lane change based on a current navigable space for the autonomous vehicle and a predicted future navigable space. The sensor data may be used by the lane change feasibility module 118 to determine the current and future navigable space for the autonomous vehicle. The navigation module 120 may use the output of the lane change feasibility module 118 to navigate the autonomous vehicle.

In some embodiments, the modules 112 may also include other modules 122 to perform various miscellaneous functionalities of the navigating device 102. It will be appreciated that the aforementioned modules 112 may be represented as a single module or a combination of different modules.

The data 114 serves, among other things, as a repository for storing data fetched, processed, received and generated by one or more of the modules 112. In one implementation, the data 114 may include vehicle configuration parameters 124, user inputs 126, sensor data 128, a current free space area 130 and a predicted free space area 132. In one embodiment, the data 114 may be stored in the memory 108 in the form of various data structures. In an example, the data 114 may also comprise other data 134 including temporary data and temporary files, generated by the modules 112 for performing the various functions of the navigating device 102.

The vehicle configuration parameters 124 may include, but are not limited to, a current velocity of the autonomous vehicle, a current acceleration of the autonomous vehicle, weight of the autonomous vehicle, maximum velocity that the autonomous vehicle can attain, and minimum velocity that the autonomous vehicle can maintain. The vehicle configuration parameters 124 may also include engine performance parameters such as power, torque, fuel consumption, an engine load, and a loading capacity. The vehicle configuration parameters 124 may also include predefined values such as a threshold distance, a threshold distance deviation, a threshold width, a threshold velocity, a threshold velocity deviation, a threshold gap, a threshold relative speed, a threshold time and an adjustment time.

The threshold distance ($Dist_{Th}$) may be a minimum distance that needs to be maintained from the front of the autonomous vehicle to an object ahead of the autonomous vehicle in order to determine the vehicle-of-interest to avoid collision. The threshold distance ($Dist_{Th}$) may be used to determine objects or vehicles that may be obstacles to the autonomous vehicle and then filtering them out. The threshold distance deviation ($Dist_{Dev}$) may be a deviation from the threshold distance ($Dist_{Th}$) that may still be tolerated to avoid collision of the autonomous vehicle with the obstacles. The threshold distance deviation ($Dist_{Dev}$) may be used to categorize an object as static or dynamic. Examples of static objects may be parked vehicles, sign posts, buildings, traffic lights, etc. Examples of dynamic objects may be other vehicles, pedestrians, motorcycles, etc..

The threshold width ($Width_{Th}$) may be a minimum distance that needs to be maintained from a side of the autonomous vehicle to a surrounding vehicle in order to avoid collision. The threshold width may be used to determine a safe distance when overtaking a vehicle in front of the autonomous vehicle. The threshold gap ($Gap_{Th}$) may be a minimum gap that needs to be maintained between the side of the autonomous vehicle and the other vehicle when both the vehicles are taking a turn, in order to avoid collision. The threshold gap ($Gap_{Th}$) may be used to determine safe turn while overtaking or giving way to the other vehicle.

The threshold velocity ($Velocity_{Th}$) may be a minimum velocity that the autonomous vehicle needs to maintain in order to overtake another vehicle. The threshold velocity ($Velocity_{Th}$) may be used to check the feasibility of overtaking a surrounding vehicle with the current velocity of the autonomous vehicle. The threshold velocity deviation ($Velocity_{ThDev}$) may be a deviation from the threshold velocity that may still be tolerated to overtake the other vehicle. The threshold velocity deviation may be used to determine estimated velocity of the autonomous vehicle based on the actual velocity of the autonomous vehicle. The threshold relative speed ($Rel\text{-}Speed_{Th}$) may be a maximum relative speed of the autonomous vehicle with respect to a surrounding vehicle that needs to be maintained to overtake the surrounding vehicle. The threshold relative speed ($Rel\text{-}Speed_{Th}$) may be used to determine the safe velocity of the autonomous vehicle with respect to the surrounding vehicle. It is to be noted that the one of more surrounding vehicles in the context of the present disclosure may include vehicles to the front of the autonomous vehicle, to either side of the autonomous vehicle or to the rear of the autonomous vehicle.

The threshold time ($Time_{Th}$) may be the minimum time within which the autonomous vehicle needs to change lane and/or overtake a surrounding vehicle in front of the autonomous vehicle. The threshold time ($Time_{Th}$) may be used to determine the vehicle potential of the autonomous vehicle to attain the required velocity within the stipulated time, in order to overtake the surrounding vehicle. Adjustment time ($Time_{Adj}$) may be the time that may be used to adjust the threshold time in accordance with the vehicle potential.

In addition to the vehicle configuration parameters 124, data 114 may also include user inputs 126. User inputs 126 may include the destination of the autonomous vehicle as input by the user and the time within which the user needs to reach the destination. The user inputs may be taken into consideration while navigating the autonomous device. For example, the navigation module may determine if a vehicle in front is to be overtaken based on the urgency of the user.

The sensor data 128 may include Lidar data, radar data, ultrasonic sensor data, and Global Positioning System (GPS) data. The current free space area 130 may indicate free space area around the autonomous vehicle. The predicted free space area 132 may indicate the free space area around the autonomous vehicle after a predefined time period.

After receiving at least one of the vehicle configuration parameters 124, the user inputs 126 and the sensor data 128, the lane change feasibility module 118 may determine a current navigable space for the autonomous vehicle. In order to determine the current navigable space, lane change feasibility module 118 may determine a relative velocity between the autonomous vehicle and each of one or more surrounding vehicles (hereinafter referred to as surrounding vehicles). Here, the surrounding vehicles may include vehicles to the front of the autonomous vehicles, to either side of the autonomous vehicle or behind the autonomous vehicle.

The lane change feasibility module 118 may use inputs from the ranging sensors 104 to determine distance between the autonomous vehicle and each of the surrounding vehicles. For example, Lidar data from a 360□ scan may be used by the lane change feasibility module 118 to determine distance between the autonomous vehicle and each surrounding vehicle within a threshold distance from the autonomous vehicle. The ranging sensor data may be collected at different points in time and a distance travelled by the surrounding car may be determined by the lane change feasibility module 118. The velocity of the surrounding car may then be determined based on the distance travelled by the car in a particular time window. The relative velocity between the autonomous vehicle and a surrounding vehicle may then be determined. Similarly, the relative velocity may be determined between the autonomous vehicle and each of the surrounding vehicles. Here, the surrounding vehicles may be defined as the vehicles within a threshold distance from the autonomous vehicle.

The relative velocity between the autonomous vehicle and each surrounding vehicle is then compared with a predefined relative speed threshold to identify a plurality of vehicles-of-interest from the at least one surrounding vehicle. The plurality of vehicles-of-interest may correspond to the surrounding vehicles in proximity to the autonomous vehicle and having a relative velocity of a value that may potentially cause the surrounding vehicles to be an obstacle for the autonomous vehicle for performing a lane change. In other words, the area of a polygon bounded by the surrounding vehicles may define a navigable space for the autonomous vehicle. This area may be determined by the lane change feasibility module 118 as the current navigable space for the autonomous vehicle. The current navigable space may be saved as current free space area 130.

After determining the current navigable space for the autonomous vehicle, a future navigable space may be predicted by the lane change feasibility module 118. The future navigable space may be predicted based on a predicted velocity and a predicted distance of the surrounding vehicles. If the velocity of a surrounding vehicle is $v_n, v_{n+1}, v_{n+2}, \ldots, v_{n+m}$ at time $t_n, t_{n+1}, t_{n+2}, \ldots, t_{n+m}$, then the predicted velocity of the surrounding vehicle at $t_{n+m+q}$ may be determined as:

$$Vel_{Predict}(i) = v_n + q * \Sigma(f_n, \ldots, f_{n+m-1})/m$$

where $f_n = (v_{n+1} - v_n)/t_n, \ldots, f_{n+m-1} = (v_{n+m} - v_{m+n-1})/t_{m+n-1}$ If the predicted velocity of a surrounding vehicle is greater than a threshold velocity, then a distance between the autonomous vehicle and the surrounding vehicle may be determined. If the velocity of the surrounding vehicle is $v_n, V_{n+1}, V_{n+2}, \ldots, V_{n+m}$ at time $t_n, t_{n+1}, t_{n+2}, \ldots, t_{n+m}$ then the predicted distance of the surrounding vehicle at time $t_{n+m+q}$ may be determined as $Dist_{Predict}(i)=v_n*q+0.5*(\Sigma(f_n,\ldots,f_{n+m-1}/m)*q^2$ where $f_n=(v_{n+1}-v_n)/t_n, \ldots, f_{n+m-1}=(v_{n+m}-v_{m+n-1})/t_{m+n-1}$ If the distance between the autonomous vehicle and the surrounding vehicle is greater than a threshold gap ($Gap_{Th}$), the surrounding vehicle may be considered a vehicle-of-interest. The predicted velocity and the predicted distance may be used to determine predicted positions of each of the surrounding vehicles. From the predicted positions of the surrounding vehicles, a future navigable space may be determined for the autonomous vehicle. The future navigable space may be the area of a polygon bounded by the predicted positions of the surrounding vehicles. This area may be saved as predicted free space area 132. The future navigable area denotes the navigable space available to the autonomous vehicle after a predefined time period. The future navigable space may be constantly computed by the lane change feasibility module 118 to determine when it is feasible for the autonomous vehicle to perform a lane change and/or overtake a vehicle in front of the autonomous vehicle. The future navigable space may be determined from the current position of the autonomous vehicle to predict if the surrounding vehicles have a tendency to move towards the autonomous vehicle or away from the autonomous vehicle in the future based on their relative velocity and distance from the autonomous vehicle.

If the future navigable space is greater than the current navigable space by a threshold area ($Area_{Th}$), then the lane change feasibility module 118 may determine that it is feasible to perform a lane change. $Area_{Th}$ may be the minimum area above the current free space area 130 that may be required to successfully change the lane and/or overtake another vehicle. Once the lane change feasibility module 118 determines that it is feasible to perform a lane change, the navigation module 120 may navigate the autonomous car accordingly. For example the navigation module 120 may determine a velocity required for the lane change. After determining the vehicle velocity, at least one of a brake, a steering, a turn signal or a throttle may be controlled to achieve the determined velocity.

The vehicle velocity for lane change may be determined by initially determining an estimated velocity as:

$Vel_{Est}=Vel_{Rel}+Velocity_{ThDev}$

Where $Vel_{Rel}$ is the relative velocity of the autonomous vehicle with respect to a surrounding vehicle that the autonomous vehicle is attempting to overtake. After determining the estimated velocity, the estimated velocity is compared with the relative speed threshold. If the estimated velocity is greater than the relative speed threshold, the estimated velocity may be considered as the vehicle velocity and it may be transmitted to the vehicle controller for moving the autonomous vehicle according to the determined vehicle velocity.

In addition to controlling the brakes the steering etc., the navigation module 120 may also determine an intermediate goal point of the autonomous vehicle when the autonomous vehicle is attempting to overtake another vehicle. The intermediate goal point may be determined from the predicted free space area 132. After determining the intermediate goal point, an intermediate path may be identified, from the current position of the autonomous vehicle to the intermediate goal point. From the intermediate path, the direction that needs to be taken for overtaking the other vehicle, is determined. The autonomous vehicle will only attempt to overtake the other vehicle if the autonomous vehicle is capable of overtaking the other vehicle in the determined direction.

In one embodiment, the direction of the autonomous vehicle may be determined using Inertial Measurement Unit (IMU) data and the current position of the autonomous vehicle may be determined using GPS data. The GPS data may be converted to a Universal Transverse Mercator (UTM) data. Using the UTM data the current position of the autonomous vehicle may be approximately determined on a map.

In addition to determining the intermediate goal point, the navigation module 120 also checks if the time ($T_{Overtake}$) taken for overtaking the other vehicle is less than the threshold time ($Time_{Th}$), i.e., $T_{Overtake}<Time_{Th}$. If the vehicle performance is such that the autonomous vehicle is unable to perform the overtaking manoeuvre within the threshold time ($Time_{Th}$), then the threshold time ($Time_{Th}$) is adjusted ($Time_{Adj}$) in accordance with the vehicle potential.

In addition to navigating the autonomous vehicle, the navigating device 102 may also provide correction to the estimated velocity ($Vel_{Est}$) of the autonomous vehicle using the actual velocity ($Vel_{Act}$) of the autonomous vehicle as a feedback.

In some embodiment, the feasibility of lane change may depend on the user inputs 126. The user inputs 126 are the destination and the time within which the user 104 needs to reach the destination. In one illustration, the navigating device 102 may decide against lane change because the user inputs 126 provides a long time for reaching the destination and hence there is no need to rush. Hence the navigating device 102 may make lane changing decisions and/or overtaking decisions by taking into consideration the urgency of the user.

Figure 2:
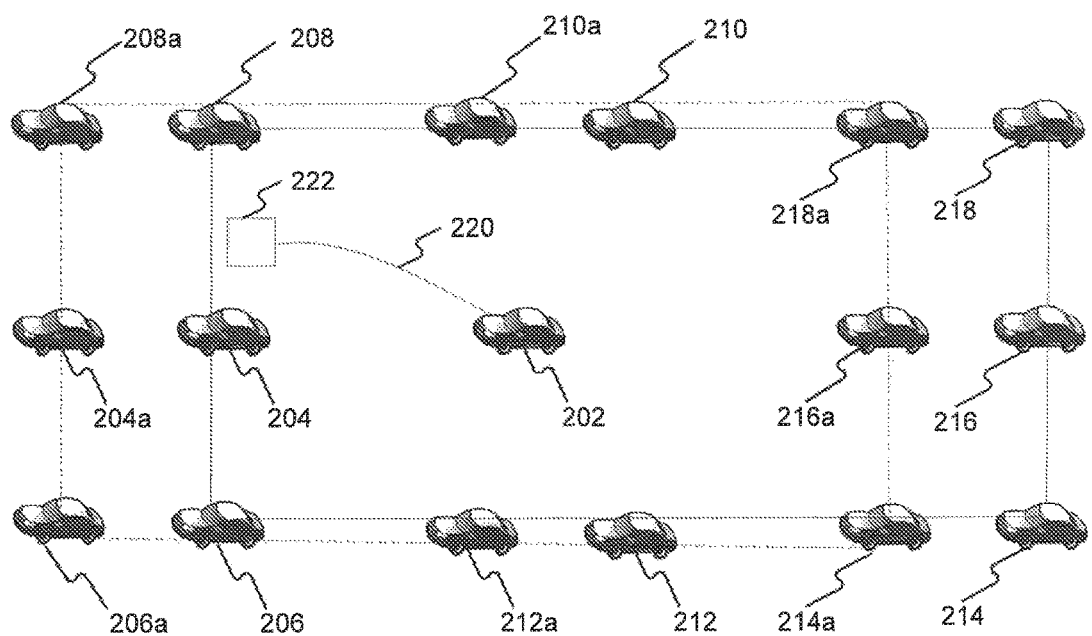
FIG. 2 is an illustrative diagram indicating a current navigable space and a predicted navigable space around an autonomous vehicle for determining feasibility of lane change in accordance with some embodiments of the present disclosure.

FIG. 2 is an illustrative diagram indicating a current free space area 130 and a predicted free space area 132 around an autonomous vehicle 202 for determining feasibility of lane change. In FIG. 2, vehicles-of-interest (204, 206, 208, 210, 212, 214, 216 and 218) are indicated around the autonomous vehicle 202. In one embodiment, the vehicles-of-interest are other vehicles that may be considered for determining the feasibility of lane change and/or overtaking. Initially, current free space area ($Area_{Current\_FreeSpace}$) 134 is determined. In the present illustration, the current free space area is $Area_{Current\_FreeSpace}$=Area (208, 204, 206, 212, 214, 216, 218, 210). The current free space area is the area of the polygon bounded by the vehicles of interest.

After determining the current free space area 130, the predicted velocity of each vehicle-of-interest is determined as:

$Vel_{ObjPredict}(i)_{tn+m+q}=V_n+q*\Sigma(f_n,\ldots,f_{n+m-1})/m$

If the predicted velocity is greater than a threshold velocity, the distance of the surrounding vehicle from the autonomous vehicle is determined.

The predicted velocity and distance may be used to determine a predicted position of the surrounding vehicles. The next step is to determine the predicted free space area 132. If in the illustration, the above mentioned conditions are satisfied by all the potential dynamic objects, then the predicted free space area is $Area_{Predict\_FreeSpace}$=Area (208a, 204a, 206a, 212a, 214a, 216a, 218a, 210a). 204a, 206a, 208a, 210a, 212a, 214a, 216a and 218a are the predicted positions of the potential dynamic objects after a predefined time period, $t_{n+m+q}$.

In FIG. 2, the autonomous vehicle 202 is attempting to overtake the surrounding vehicle 204. An intermediate goal point 222 is also indicated in FIG. 2 (indicated as a square for illustrative purposes only). The intermediate goal point 222 may be determined from the predicted free space area $Area_{Predict\_FreeSpace}$ 136. After determining the intermediate goal point 222, an intermediate path 220 may be identified, from the current position of the autonomous vehicle 202 to the intermediate goal point 222. From the intermediate path 220, the direction that the autonomous vehicle 202 needs to take in order to overtake the potential dynamic object 204 is identified. The autonomous vehicle 202 needs to continue in the same direction as before. Hence the autonomous vehicle 202 is capable of following this direction and therefore may overtake the potential dynamic object 204.

Figure 3:
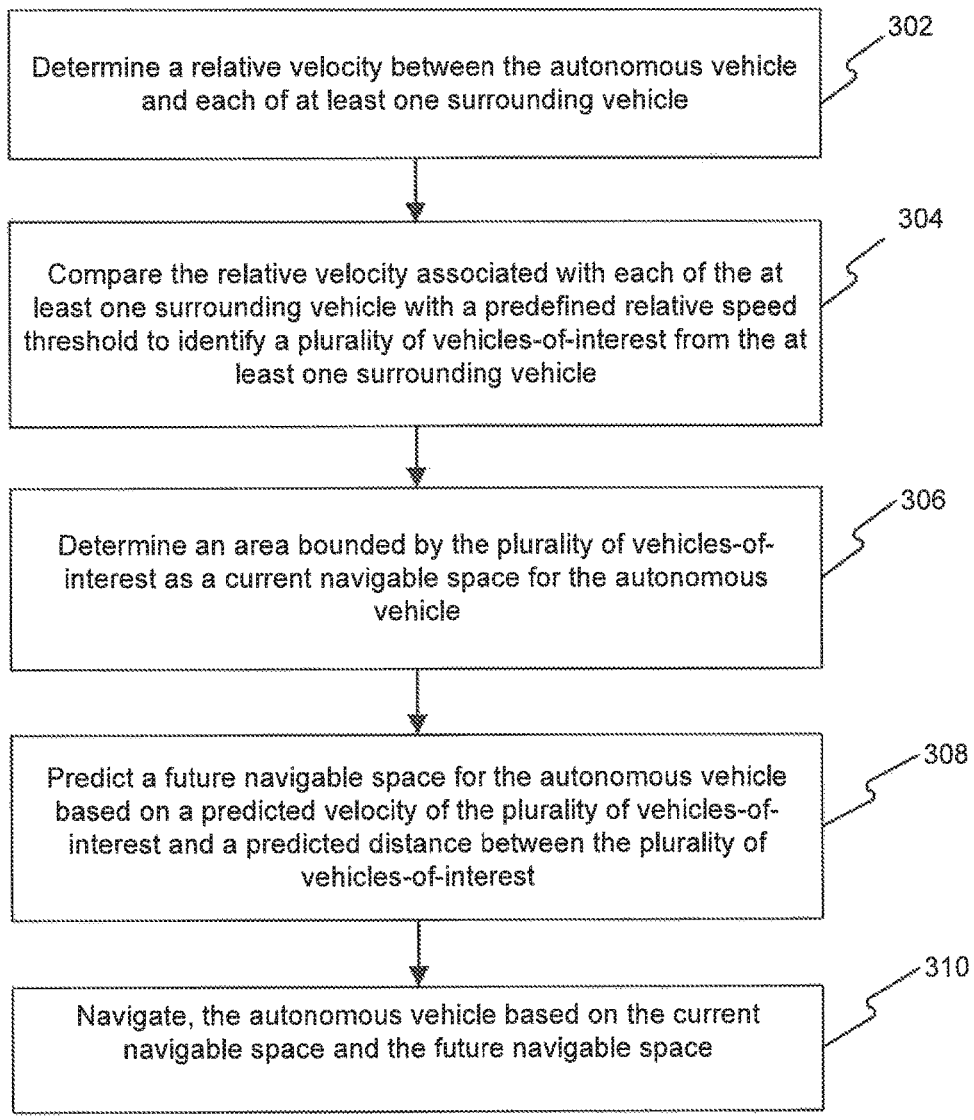
FIG. 3 is a flow diagram illustrating a method of navigating an autonomous vehicle in accordance with some embodiments of the present disclosure.

FIG. 3 is a flow diagram illustrating a method of navigating an autonomous vehicle 202. At step 302, a relative velocity between the autonomous vehicle and each of at least one surrounding vehicle may be determined. Here, a surrounding vehicle may be defined as a vehicle within a predefined distance from the autonomous vehicle 202 to the front of the autonomous vehicle, on either side of the autonomous vehicle 202 or behind the autonomous vehicle. Determining the relative velocity between the autonomous vehicle 202 and each surrounding vehicle is explained in detail in conjunction with FIG. 1.

On determining the relative velocity between the autonomous vehicle 202 and each surrounding vehicle, at step 304, the relative velocity associated with each of the surrounding vehicles may be compared with a predefined relative speed threshold. The relative velocity associated with each surrounding vehicle may be compared with the predefined relative speed threshold to identify a plurality of vehicles-of-interest from the surrounding vehicles. The plurality of vehicles-of-interest may correspond to the surrounding vehicles in proximity to the autonomous vehicle and having a relative velocity of a value that may potentially cause the surrounding vehicles to be an obstacle for the autonomous vehicle for performing a lane change or overtaking another vehicle.

Thereafter, at step 306, a current navigable space for the autonomous vehicle 202 may be determined. The current navigable space may be determined as the area of a polygon bounded by the identified vehicles-of-interest. Determining the current navigable space for the autonomous vehicle 202 is explained in detail in conjunction with FIG, 1.

After determining the current navigable space for the autonomous vehicle 202, a future navigable space may be predicted at step 308. The future navigable space may be predicted based on a predicted velocity and a predicted distance of the surrounding vehicles. If the predicted velocity of a surrounding vehicle is greater than a threshold velocity, then a distance between the autonomous vehicle and the surrounding vehicle may be determined. If the distance between the autonomous vehicle and the surrounding vehicle is greater than a threshold gap ($Gap_{Th}$), the surrounding vehicle may be considered a vehicle-of-interest. The predicted velocity and the predicted distance may be used to determine predicted positions of each of the surrounding vehicles. From the predicted positions of the surrounding vehicles, a future navigable space may be determined for the autonomous vehicle. Predicting the future navigable space for the autonomous vehicle 202 is explained in detail in conjunction with FIG. 1 and FIG. 2.

Thereafter, at step 310, the autonomous vehicle 202 may be navigated based on the determined current navigable space and the future navigable space. For example, if the future navigable space is greater than the current navigable space by a threshold area ($Area_{Th}$), then a lane change may be performed. Navigating the autonomous vehicle 202 based on the current navigable space and the future navigable space is explained in detail in conjunction with FIG. 1.

Computer System

FIG. 4 is a block diagram of an exemplary computer system for implementing embodiments consistent with the present disclosure. Variations of computer system 401 may be used for implementing the vehicle navigating device. Computer system 401 may comprise a central processing unit ("CPU" or "processor") 402. Processor 402 may comprise at least one data processor for executing program components for executing user- or system-generated requests. A user may include a person, a person using a device such as such as those included in this disclosure, or such a device itself. The processor 402 may include specialized processing units such as integrated system (bus) controllers, memory management control units, floating point units, graphics processing units, digital signal processing units, etc. The processor 402 may include a microprocessor, such as AMD Athlon, Duron or Opteron, ARM's application, embedded or secure processors, IBM PowerPC, Intel's Core, Itanium. Xeon, Celeron or other line of processors, etc. The processor 402 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 402 may be disposed in communication with one or more input/output (I/O) devices via I/O interface 403. The I/O interface 403 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 403, the computer system 401 may communicate with one or more I/O devices. For example, the input device 404 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 405 may be a printer, fax machine, video display (e.g., cathode ray tube (CRT), liquid crystal display (LCD), light-emitting diode (LED), plasma, or the like), audio speaker, etc. In some embodiments, a transceiver 406 may be disposed in connection with the processor 402. The transceiver 406 may facilitate various types of wireless transmission or reception. For example, the transceiver 406 may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 402 may be disposed in communication with a communication network 408 via a network interface 407. The network interface 407 may communicate with the communication network 408. The network interface 407 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 408 may include, without limitation, a direct interconnection, local area network (LAN), wide area network (WAN), wireless network (e.g., using Wireless Application Protocol), the Internet, etc. Using the network interface 407 and the communication network 408, the computer system 401 may communicate with devices 409, 410, and 411. These devices 409, 410, and 411 may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 401 may itself embody one or more of these devices 409, 410, and 411.

In some embodiments, the processor 402 may be disposed in communication with one or more memory devices 415 (e.g., RAM 413, ROM 414, etc.) via a storage interface 412. The storage interface 412 may connect to memory devices 415 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices 415 may store a collection of program or database components, including, without limitation, an operating system 416, user interface application 417, web browser 418, mail server 419, mail client 420, user/application data 421 (e.g., any data variables or data records discussed in this disclosure), etc. The operating system 416 may facilitate resource management and operation of the computer system 401. Examples of operating systems 416 include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 417 may facilitate display, execution, interaction, manipulation, or operation of program components through textual or graphical facilities. For example, user interfaces 417 may provide computer interaction interface elements on a display system operatively connected to the computer system 401, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 401 may implement a web browser 418 stored program component. The web browser 418 may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers 418 may utilize facilities such as AJAX, DHTML, Adobe Flash, JavaScript, Java, application programming interfaces (APIs), etc. In some embodiments, the computer system 401 may implement a mail server 419 stored program component. The mail server 419 may be an Internet mail server such as Microsoft Exchange, or the like. The mail server 419 may utilize facilities such as ASP, ActiveX, ANSI C++/C#, Microsoft .NET, CGI scripts, Java, JavaScript, PERL, PHP, Python, WebObjects, etc. The mail server 419 may utilize communication protocols such as Internet message access protocol (IMAP), messaging application programming interface (MAPI), Microsoft Exchange, post office protocol (POP), simple mail transfer protocol (SMTP), or the like. In some embodiments, the computer system 401 may implement a mail client 420 stored program component. The mail client 420 may be a mail viewing application, such as Apple Mail, Microsoft Entourage, Microsoft Outlook, Mozilla Thunderbird, etc.

In some embodiments, computer system 401 may store user/application data 421, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

The specification has described application title. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

We claim:

1. A method of navigating an autonomous vehicle communicatively coupled to one or more ranging sensors, the method comprising:
   determining, by a navigating device, a relative velocity between the autonomous vehicle and each of at least one surrounding vehicle using the one or more ranging sensors;
   comparing, by the navigating device, the relative velocity associated with each of the at least one surrounding vehicle with a predefined relative speed threshold to identify a plurality of vehicles-of-interest from the at least one surrounding vehicle;
   determining, by the navigating device, an area bounded by the plurality of vehicles-of-interest as a current navigable space for the autonomous vehicle;
   predicting, by the navigating device, a future navigable space for the autonomous vehicle based on a predicted velocity of the plurality of vehicles-of-interest and a predicted distance between the autonomous vehicle and each of the plurality of vehicles-of-interest, wherein the future navigable space comprises navigable space of the autonomous vehicle after a predefined time period from a time of determining the current navigable space; and
   navigating, by the navigating device, the autonomous vehicle based on the current navigable space and the future navigable space.

2. The method of claim 1, wherein the at least one surrounding vehicle is within a threshold distance from the autonomous vehicle.

3. The method of claim 1, wherein the current navigable space is based on a distance between the autonomous vehicle and the plurality of vehicles-of-interest.

4. The method of claim 1, wherein navigating the autonomous vehicle comprises changing a lane.

5. The method of claim 4, further comprising determining an overtake velocity to change the lane based on a relative velocity between the autonomous vehicle and each of the plurality of vehicles-of-interest.

6. The method of claim 5, further comprising controlling at least one of brake, steering, a turn signal or a throttle based on the determined overtake velocity.

7. The method of claim 1, further comprising determining an intermediate goal point for the autonomous vehicle based on the future navigable space.

8. A navigating device for navigating an autonomous vehicle communicatively coupled to one or more ranging sensors, the navigating device comprising, a processor;
   a memory communicatively coupled to the processor, wherein the memory stores the processor-executable instructions, which, on execution, causes the processor to:
   determine a relative velocity between the autonomous vehicle and each of at least one surrounding vehicle using the one or more ranging sensors;
   compare the relative velocity associated with each of the at least one surrounding vehicle with a predefined relative speed threshold to identify a plurality of vehicles-of-interest from the at least one surrounding vehicle;
   determine an area bounded by the plurality of vehicles-of-interest as a current navigable space for the autonomous vehicle;
   predict a future navigable space for the autonomous vehicle based on a predicted velocity of the plurality of vehicles-of-interest and a predicted distance between the autonomous vehicle and each of the plurality of vehicles-of-interest, wherein the future navigable space comprises navigable space of the autonomous vehicle after a predefined time period from a time of determining the current navigable space; and
   navigate the autonomous vehicle based on the current navigable space and the future navigable space.

9. The navigating device of claim 8, wherein the at least one surrounding vehicle is within a predefined distance from the autonomous vehicle.

10. The navigating device of claim 8, wherein the current navigable space is based on a distance between the autonomous vehicle and the plurality of vehicles-of-interest.

11. The navigating device of claim 8, wherein navigating the autonomous vehicle comprises changing a lane.

12. The navigating device of claim 11, wherein the memory further comprises instructions to determine an overtake velocity to change the lane based on a relative velocity between the autonomous vehicle and each of the plurality of vehicles-of-interest.

13. The navigating device of claim 12, wherein the memory further comprises instructions to control at least one of a brake, steering, a turn signal or a throttle based on the determined overtake velocity.

14. The navigating device of claim 8, wherein the memory further comprises instructions to determine an intermediate goal point for the autonomous vehicle based on the future navigable space.

15. A non-transitory computer readable storage medium storing a program that, when executed by a computer, cause the computer to perform a method of navigating an autonomous vehicle communicatively coupled to one or more ranging sensors, the method comprising:
   determining a relative velocity between the autonomous vehicle and each of at least one surrounding vehicle using the one or more ranging sensors;
   comparing the relative velocity associated with each of the at least one surrounding vehicle with a predefined relative speed threshold to identify a plurality of vehicles-of-interest from the at least one surrounding vehicle;
   determining an area bounded by the plurality of vehicles-of-interest as a current navigable space for the autonomous vehicle;
   predicting a future navigable space for the autonomous vehicle based on a predicted velocity of the plurality of vehicles-of-interest and a predicted distance between the autonomous vehicle and each of the plurality of vehicles-of-interest, wherein the future navigable space comprises navigable space of the autonomous vehicle after a predefined time period from a time of determining the current navigable space; and
   navigating the autonomous vehicle based on the current navigable space and the future navigable space.

* * * * *